United States Patent [19]

Brahm et al.

[11] Patent Number: 4,857,292
[45] Date of Patent: Aug. 15, 1989

[54] PROCESS FOR THE PRODUCTION OF CALCIUM HYPOCHLORITE AND PRODUCT OBTAINED BY THIS PROCESS

[75] Inventors: Jacques Brahm, Grimbergen, Belgium; Pierre Cornu, Tavaux; Pierre Garnier, Chaussin, both of France; Jean Verlaeten, Brussels; Jacques Van Diest, Rhode-Saint-Genese, both of Belgium

[73] Assignee: SOLVAY & Cie (Societe Anonyme), Brussels, Belgium

[21] Appl. No.: 131,675

[22] Filed: Dec. 11, 1987

[30] Foreign Application Priority Data

Dec. 15, 1986 [FR] France .............................. 86 17620

[51] Int. Cl.$^4$ ............................................ C01B 11/06
[52] U.S. Cl. .................................... 423/473; 423/474
[58] Field of Search ............... 423/474, 163, 499, 473, 423/474; 252/187.28, 187.30

[56] References Cited

U.S. PATENT DOCUMENTS

| 1,787,048 | 12/1930 | MacMullin et al. | 423/474 |
|---|---|---|---|
| 1,937,613 | 12/1933 | Weber, Jr. | 423/474 |
| 3,134,641 | 5/1964 | Gleichert | 423/474 |
| 3,572,989 | 3/1971 | Tatara et al. | 423/474 |
| 3,895,099 | 7/1975 | Sakowski | 423/474 |
| 4,105,565 | 8/1978 | Wojtowicz | 423/474 |
| 4,367,209 | 1/1983 | Sakowski et al. | 423/474 |
| 4,400,304 | 8/1983 | Clark et al. | 423/499 |
| 4,428,918 | 1/1984 | Verlaeten et al. | 423/473 |

FOREIGN PATENT DOCUMENTS

| 0046048 | 2/1982 | European Pat. Off. | 423/474 |
|---|---|---|---|
| 60126 | 9/1982 | European Pat. Off. | 423/474 |
| 323205 | 12/1929 | United Kingdom | 423/474 |
| 1064461 | 4/1967 | United Kingdom | 423/473 |

OTHER PUBLICATIONS

Perry et al., "Chemical Engineers' Handbook", 5th Ed., 17-10, 11, 12 (McGraw-Hill Book Company).

Primary Examiner—John Doll
Assistant Examiner—Jeffrey Edwin Russel
Attorney, Agent, or Firm—Stevens, Davis, Miller & Mosher

[57] ABSTRACT

An aqueous sodium hypochlorite solution (3) is added, in a quantity which is deficient relative to that required to decompose the entire amount of calcium chloride, to an aqueous calcium chloride solution (2), the sodium chloride which precipitates (6) is separated and the remaining amount (9) of the sodium hypochlorite solution is then added to the resulting mother-liquor (7). Single FIGURE.

8 Claims, 1 Drawing Sheet

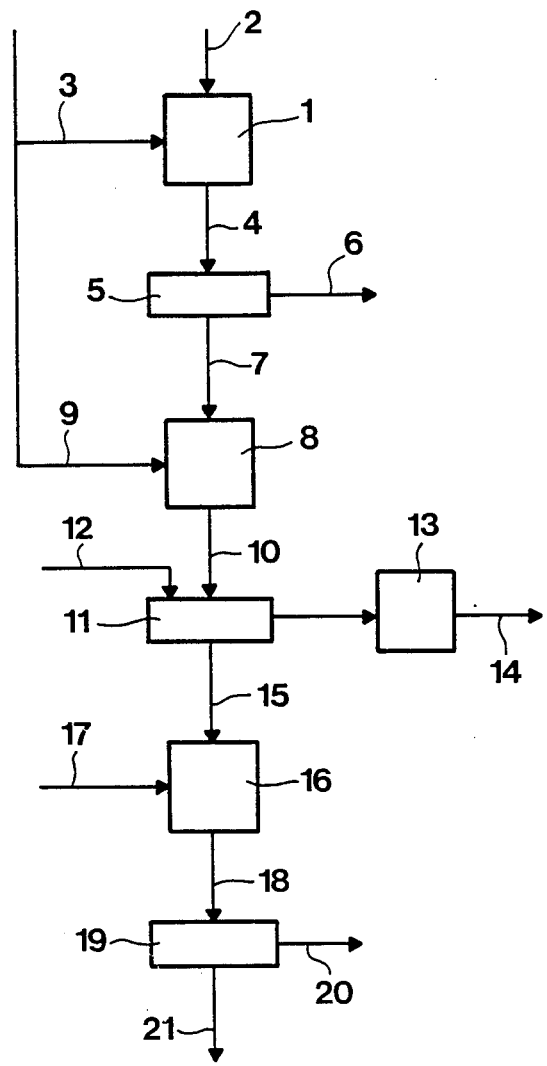

PROCESS FOR THE PRODUCTION OF CALCIUM HYPOCHLORITE AND PRODUCT OBTAINED BY THIS PROCESS

The present invention relates to a process for the production of calcium hypochlorite. It also relates to the product obtained by applying the said process.

The production of calcium hypochlorite by reacting an aqueous sodium hypochlorite solution with calcium chloride according to the following reaction is known:

$$2\ NaOCl + CaCl_2 \rightarrow Ca(OCl)_2 + 2\ NaCl.$$

Thus, the chlorination of an aqueous sodium hydroxide solution in order to produce an aqueous sodium hypochlorite solution to which calcium chloride is added in the solid state so as to form calcium hypochlorite in the form of a slurry which is then evaporated to dryness or filtered, has been proposed in British Pat. No. 323,205. The product obtained may contain up to 60% by weight of sodium chloride, which may constitute a disadvantage. In order to overcome this disadvantage, the dilution of the sodium hypochlorite solution to an extent sufficient to avoid the precipitation of sodium chloride during the addition of calcium chloride has been proposed in the same British patent. However, this variant of the process makes it necessary to handle large volumes of substance and consequently involves the use of high-volume equipment; additionally, it gives rise to a loss of calcium hypochlorite dissolved in the sodium chloride solution, this adversely affecting the yield of the process.

The invention aims at overcoming the abovementioned disadvantages by providing a process which enables good quality calcium hypochlorite to be obtained with a good yield and without the need for handling large volumes of substance.

Therefore, the invention relates to a process for the production of calcium hypochlorite by reacting an aqueous sodium hypochlorite solution with calcium chloride; according to the invention, the calcium chloride is employed in the form of an aqueous solution, a fraction of the sodium hypochlorite solution which is less than the stoichiometric quantity required to decompose the entire amount of calcium chloride is added to the calcium chloride solution, the sodium chloride that precipitates is separated and the remaining amount of the sodium hypochlorite solution is then added to the reaction medium.

In the process according to the invention, the respective concentrations of the aqueous sodium hypochlorite solution and of the aqueous calcium chloride solution must be sufficient to cause the precipitation of calcium hypochlorite. A concentrated aqueous sodium hypochlorite solution having a concentration higher than 60 units on the chlorometric scale and an aqueous calcium chloride solution containing more than 250 g of calcium chloride per kg are generally employed.

By definition, the concentration of an aqueous sodium hypochlorite solution, in chlorometric scale units, expresses the number of liters of chlorine at 0° C. and $10^5$ Pa which has the same oxidizing power as one liter of the solution at 20° C.

An aqueous sodium hypochlorite solution having a concentration of at least 63, preferably 100, chlorometric scale units is advantageously employed. It is generally inadvisable for the concentration of the sodium hypochlorite solution to exceed 140 chlorometric scale units because, beyond this concentration, the stability of the solution tends to decrease rapidly.

Moreover, all other things being equal, it has proven particularly advantageous to employ aqueous sodium hypochlorite solutions having a low OH$^-$ ion concentration. Aqueous solutions containing less than 8 g of OH$^-$ ions per liter are preferred.

Moreover, the use of aqueous calcium chloride solutions containing at least 40% by weight of calcium chloride is preferred. These may be obtained by dissolving calcium chloride particles in water.

In the process according to the invention, the precipitation of sodium chloride following the addition of the fraction of the sodium hypochlorite solution may be accompanied by a precipitation of calcium hypochlorite. Consequently, the choice of the fraction to be employed is a compromise: the fraction must be sufficient to cause the precipitation of a substantial quantity of sodium chloride, avoiding, however, the precipitation of an excessive quantity of calcium hypochlorite. As a general rule, the optimum value for the said fraction depends on various parameters, especially on the respective concentrations of the sodium hypochlorite and calcium chloride solutions, on the residual sodium chloride content tolerated in the calcium hypochlorite produced, and on the yield sought. In general, it is advisable that it represents between 5 and 35% by weight of the stoichiometric quantity required to decompose the entire amount of calcium chloride. Values of between 8 and 25% by weight are particularly advantageous in the case where the sodium hypochlorite solution has a concentration of at least 100 chlorometric scale units and the aqueous calcium chloride solution has a concentration at least equal to 40% by weight of calcium chloride.

The process according to the invention may be carried out at all temperatures at which the aqueous solutions employed are in the liquid state. In practice, suitable temperatures are those between 15° and 100° C., for example between 30° and 60° C.

At the end of the process according to the invention, an aqueous suspension of calcium hypochlorite is collected. The latter may be treated by any means suitable for recovering in the solid state the calcium hypochlorite which it contains.

In a preferred embodiment of the process according to the invention, the suspension is subjected to a filtration and/or to a phase separation (achieved by sedimentation or centrifugation), so as to collect separately the calcium hypochlorite on the one hand and the mother-liquor on the other. In this embodiment of the process according to the invention, the mother-liquor still contains a relatively large proportion of hypochlorite (ClO$^-$) ions, the exploitation of which is advantageous. For this purpose, an advantageous modified embodiment of the process according to the invention provides for treating the mother-liquor by adding sodium carbonate to the latter in order to insolubilize the calcium which it contains, in the form of calcium carbonate. The mother-liquor remaining after the separation of the calcium carbonate precipitate then consists of a dilute sodium hypochlorite solution which may be recycled as such into the process, or employed for preparing the aqueous calcium chloride solution by dissolving calcium chloride particles, or alternatively made use of for the production of sodium hypochlorite having a high concentration, for example equal to or higher than 60 chlorometric scale units.

The process according to the invention enables good quality calcium hypochlorite having a low sodium chloride content to be produced economically. It provides the additional advantage of reducing the heavy metal (Ni, Cr, Mo, Co, Cu) content in the calcium hypochlorite produced; these metals which originate from the salt employed to prepare the aqueous sodium hypochlorite solution are precipitated with sodium chloride when the fraction of the sodium hypochlorite solution is added.

The invention also relates to the solid calcium hypochlorite obtained according to the process described above. This product, which finds a use in the treatment of water for swimming pools, may be packaged in the form of pellets, for example cylindrical.

BRIEF DESCRIPTION OF THE DRAWING

The characteristics and the details of the invention will emerge from the following description of the single FIGURE in the drawing attached, which represents the block diagram of a particular embodiment of the process according to the invention.

An aqueous calcium chloride solution 2 and an aqueous sodium hypochlorite solution 3 are introduced into a reaction chamber 1. Solution 3 is employed in a quantity which represents only a fraction of the stoichiometric quantity required to decompose the entire amount of the calcium chloride solution 2. The resultant reaction mixture 4 is a slurry containing a precipitate of sodium chloride particles in an aqueous solution of calcium chloride, calcium hypochlorite and soldium chloride. This is directed to a filter 5 in which the precipitate 6 is separated, and the resulting filtrate 7 is introduced into a second reaction chamber 8 into which the remaining sodium hypochlorite solution 9, which is required to decompose the entire amount of the calcium chloride of solution 7, is introduced. A slurry 10 is collected from the reaction chamber 8 and directed towards a filter 11. The filter cake may be washed, if required, on the filter, with the water 12. It is then directed to a drying equipment 13 from which the finished product 14 is extracted. The latter essentially consists of calcium hypochlorite particles.

The filtrate 15 drawn off from the filter 11 is an aqueous calcium hypochlorite solution. It is directed into a reaction chamber 16 in which it is treated with a quantity of sodium carbonate 17 which is sufficient to decompose the entire amount of calcium hypochlorite. The resulting aqueous slurry 18 is directed to a filter 19 in which a calcium carbonate precipitate 20 and an aqueous sodium hypochlorite solution 21 are separated.

The aqueous sodium hypochlorite solution 21 may be employed to reconstitute the calcium chloride solution 2 by dissolving calcium chloride particles. As a variant, it may be used for the preparation of an aqueous sodium hypochlorite solution having a high concentration, for example higher than 100 chlorometric scale units and, for this purpose, it may be made use of in the process described in European Pat. No. 54,996 (Solvay & Cie).

The following example will reveal the usefulness of the invention.

100 kg of an aqueous sodium hypochlorite solution having a high concentration (approximately 100 chlorometric scale units) and 50.5 kg of an aqueous 40% by weight calcium chloride solution were employed. The sodium hypochlorite solution had the following composition:

ClO$^-$: 252 g/l
Cl$^-$: 61 g/l
OH$^-$: 6.3 g/l

The 50.5 kg of calcium chloride solution (2) were first treated with 15 kg (3) of the sodium hypochlorite solution in order to precipitate sodium chloride. By filtering the resulting reaction medium (4), a precipitate weighing 6 kg (6) and a filtrate weighing 59.5 kg (7) were separated.

The major part of the precipitate (6) consisted of sodium chloride and had the following composition by weight:

Cl$^-$: 46.2%
Ca$^+$: 4.4%
ClO$^-$: 2.6%

The filtrate (7) was introduced into a reactor (8) at the same time as the remaining amount (85 kg) of the sodium hypochlorite solution (9). In this reactor, the mixture was maintained stirred at a temperature of 40° C. 144.5 kg of an aqueous calcium hypochlorite suspension (10) were collected from the reactor and transferred onto a filter (11). The filter cake was washed on the filter with 11.5 kg of washing water (12). 121.5 kg of mother-liquor (15) and 34.5 kg of a cake were separated from the filter and the cake was treated in a vacuum drier (13) at 50° C. to separate 15.3 kg of water, and 19.2 kg of dried calcium hypochlorite (14), having the following composition, were recovered:

Ca(OCl)$_2$: 74.7%
NaCl: 13.1%
H$_2$O: 12.2%
Ni: 1 ppm
Cr: <1 ppm
Fe: 2 ppm
Cu: <1 ppm The mother-liquor (15) had the following composition by weight:

ClO$^-$: 7.5%
Cl$^-$: 11.4%
Ca$^{++}$: 2.1%

This was treated with 7.4 kg of sodium carbonate (17), which gave rise to the formation of a moist precipitate weighing 9.7 kg and containing 30% by weight of calcium carbonate and 70% of water. After the separation of this precipitate, 119.2 kg of a dilute sodium hypochlorite solution (21) were recovered.

We claim:

1. Process for the production of calcium hypochlorite by reacting an aqueous sodium hypochlorite solution with calcium chloride, characterized in that the calcium chloride is employed in the form of an aqueous solution, a fraction of the sodium hypochlorite solution which is less than the stoichiometric quantity required to decompose the entire amount of calcium chloride is added to the calcium chloride solution, the sodium chloride that precipitates is separated from the resulting reaction medium, and the remaining amount of the sodium hypochlorite solution is then added to the reaction medium.

2. Process according to claim 1, characterized in that an aqueous calcium chloride solution containing at least 40% by weight of calcium chloride and an aqueous sodium hypochlorite solution having a concentration of at least 100 chlorometric scale units are employed.

3. Process according to claim 2, characterized in that the abovementioned fraction of the sodium hypochlorite solution corresponds to a weight of between 8 and 25% of the weight of the stoichiometric quantity required to decompose the entire amount of calcium chloride employed.

4. Process according to claim 1, characterized in that an aqueous sodium hypochlorite solution which contains less than 8 g of $OH^-$ ions per liter is employed.

5. Process according to claim 1, characterized in that the reaction is performed at a temperature of between 30° and 60° C.

6. Process according to claim 1, characterized in that after adding the remaining amount of sodium hypochlorite solution to the reaction medium, the latter is subjected to a filtration and/or a phase separation in order to recover the calcium hypochlorite which has precipitated.

7. Process according to claim 6, characterized in that sodium carbonate is added to the mother-liquor from the calcium hypochlorite precipitation in order to decompose the calcium hypochlorite dissolved therein, the calcium carbonate which precipitates is separated and the resulting aqueous sodium hypochlorite solution is recovered.

8. Process according to claim 7, characterized in that solid calcium chloride is dissolved in the resulting aqueous sodium hypochlorite solution mentioned above in order to reconstitute the aqueous calcium chloride solution.

* * * * *